3,226,264
METHOD OF IMPROVING LITHIATED NICKEL OXIDE FUEL CELL ELECTRODES
A. David Joseph, South Windsor, and John A. Petrusha, Windsor Locks, Conn., assignors, by mesne assignments, to Leesona Corporation, Cranston, R.I., a corporation of Massachusetts
Filed Apr. 18, 1962, Ser. No. 188,579
2 Claims. (Cl. 136—120)

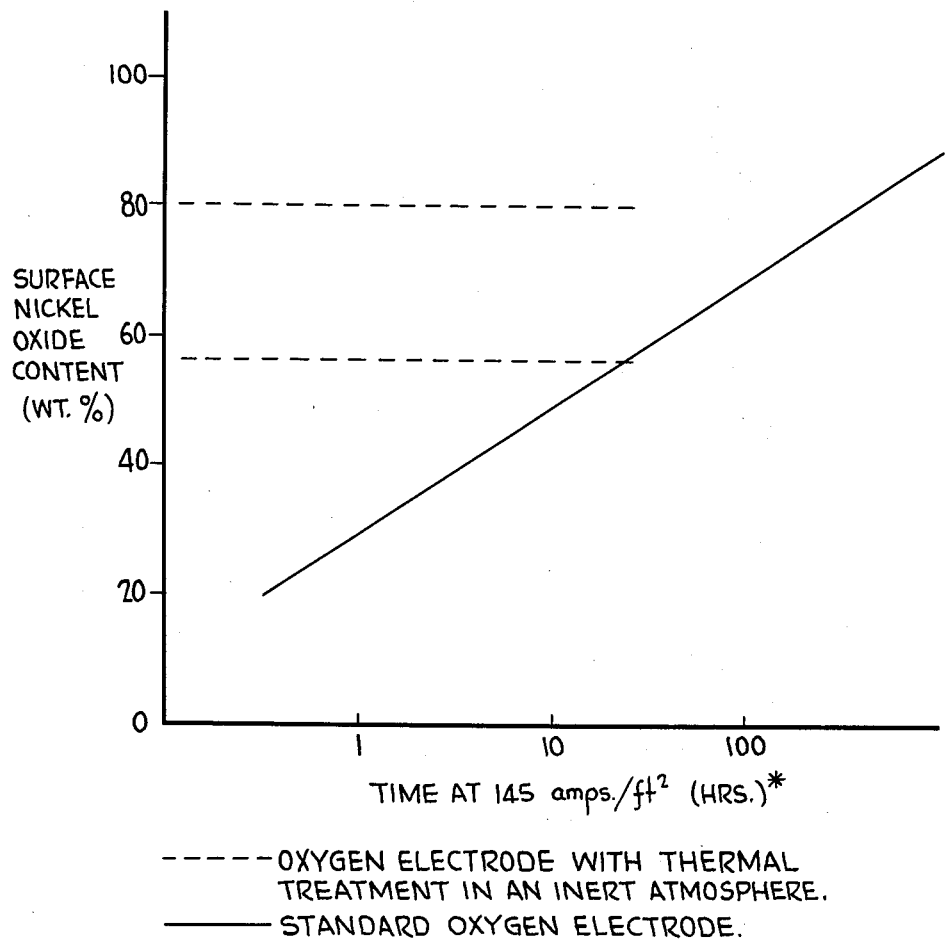

This invention relates to improved fuel cell electrodes and more particularly to lithiated nickel oxide electrodes which possess superior corrosion and resistivity characteristics in relation to known prior art electrodes.

In the prior art, the micro-metallic type electrodes are employed extensively in fuel cells due to their superior catalytic activity. However, since the electrodes under normal operating conditions of the cell are subjected to environments highly conducive to corrosion, it is necessary to select metals possessing good corrosion resistant properties as well as good catalytic characteristics. Thus, due to their superior properties in these areas, nickel electrodes are advantageously employed.

However, it was found that nickel electrodes, upon prolonged use in a fuel cell, developed a surface film of green nickel oxide which film, while highly resistant to corrosive influences, is substantially non-conductive of an electric current. Thus, the electrode is rendered substantially ineffective in the operation of a fuel cell. Therefore, in order to overcome the non-conductive properties of the electrode, the formation of a lithium oxide/nickel oxide film on the nickel electrode was suggested by Francis T. Bacon in U.S. Patent No. 2,716,670. Electrodes treated in this manner have been found to be resistant to the corrosive influences in the cell while still being capable of conducting an electric current.

It has now been found that surprisingly improved fuel cell electrode characteristics can be obtained from lithiated nickel oxide electrodes which have been subjected to an additional heat treatment in an inert atmosphere or vacuum. The heat treated electrodes possess superior electrical conductivity and are highly resistant to corrosion.

Accordingly, it is an object of the instant invention to provide a fuel cell electrode having improved corrosion resistant characteristics.

It is another object of the instant invention to provide a fuel cell electrode having improved electrical conductivity.

It is still another object of the instant invention to provide a fuel cell electrode having excellent catalytic activity.

These and other objects of the instant invention will become more apparent from the following detailed description, with particular emphasis being placed on the illustrative example.

The above objects of the instant invention are accomplished by constructing a porous catalytic electrode from nickel with subsequent oxidation and lithiation and thereafter subjecting the electrode to an annealing heat treatment in the absence of air. The surface layer on the nickel electrodes are thus rendered passive to further oxidation. The annealing heat treatment can be accomplished in the presence of an inert gas such as argon, nitrogen or krypton, or if desired, the heat treating process can be carried out under vacuum. The temperature range for performing the annealing heat treatment can be varied over a fairly wide range, however, it has been found that below a temperature of about 850° F., very little diffusion occurs, resulting in a little or no change in the electrode structure. At temperatures above about 1500° F., the electrode surface will sinter, modifying the porosity of the structure and thereby the gas and electrolyte control characteristics of the electrode. For this reason, it is preferred that the annealing heat treatment be carried out at temperatures of from about 900–1400° F., although temperatures outside this range may be selected provided care is exercised.

The duration of the annealing heat treatment can be modified, depending primarily upon the temperature selected for the annealing operation. In other words, since time and temperature are inter-related, it is possible to obtain substantially the same results by heating at a lower temperature for a longer period of time or by heating for a shorter period of time at a higher temperature. As a practical matter, however, it has been found that the annealing heat treatment is most advantageously carried out at a temperature of from about 900° F. for a period of about 2 hours or at a temperature of about 1500° F. for a period of about 15 minutes. Depending upon available equipment, etc. the temperature of the annealing treatment and the duration can be modified in order that they fall within the above range.

The instant invention does not embrace any particular method of preparing the electrode nor is it to be limited thereby. As an illustrative method, nickel powders can be placed in a suitable disc and thereafter compacted, sintered, oxidized and lithiated by methods known in the art. After the usual sintering operation, the electrode is subjected to the annealing heat treatment in an inert atmosphere or under vacuum to obtain the improved electrode. Alternatively, a lithiated nickel-nickel oxide electrode can be made by dusting a nickel powder of suitable particle size into a mold and sintering, without compaction, under pressure. The resulting structure is then soaked in a solution of lithium hydroxide or lithium nitrate. The solution employed preferably is a saturated solution, as for example, one containing about 13 grams lithium hydroxide per 100 ml. water. The electrode structure is then dried and oxidized by heating in air. Thereafter, the structure is subjected to an additional heat treatment in an inert atmosphere or under vacuum to obtain the improved electrode structure.

Additionally, depending upon the ultimate use of the electrode structure, it is possible to make a dual porosity electrode. The techniques for fabricating such electrodes are known in the art. One method would be to first form a coarse pore layer as described hereinbefore, and thereafter apply a fine pore layer on one surface thereof by spraying a suspension of finer nickel powders in alcohol on the coarse pore layer. The fine pore layer is bonded to the coarse layer by sintering.

A second method of forming the dual porosity structure comprises the preparation of a fine pore layer by placing a ring with a lip over a suitable disc, adding nickel metal powder of selected particle size to the disc and ring so that a layer of powder approximately the thickness of the lip remains. Thereafter, a second ring with a lip is placed over the entire fine pore assembly and selected coarse particle size nickel is added to the ring. The whole assembly is compacted and sintered. After the structure is oxidized and lithiated the subsequent annealing heat treatment in an inert atmosphere, as described hereinbefore, is carried out.

Having described the instant invention in general terms, the following examples will set forth in greater detail a preferred embodiment.

*Example*

A bi-porous electrode structure is formed by placing a ring having a lip upon a bottom dye. The ring and lip are filled with a fine pore nickel powder having a particle size of about seven microns. Excess powder is struck off so that a layer of powder approximately the thickness of the lip remains. A second ring with a lip of 0.35 inch in thickness is placed over the entire fine pore assembly and coarse nickel powder having a particle size of about 50 microns is carefully sifted into the ring and leveled off at the surface of the coarse pore ring. A cap is placed over the assembly and the powders compacted by vertical vibrations for three minutes at an amplitude of 0.004 inch. The structure is then sintered in a neutral atmosphere at 1830° F. for 45 minutes. The resultant structure is immersed in a solution of lithium hydroxide which contained 12.7 grams of lithium hydroxide per 100 ml. of water and soaked for 30 minutes. The structure is removed from the lithium hydroxide solution and dried at 120° C. for 20 minutes. The structure is oxidized by heating in air at 900° F. for 20 minutes. The resultant lithiated structure is then heated for 45 minutes at 1350° F. in an argon atmosphere.

The resultant structure when employed in a fuel cell is highly resistant to corrosion. When compared with an electrode prepared in an identical manner except for the thermo-treatment in an inert atmosphere, superior corrosion resistant properties are apparent as indicated in the drawing. Thus the drawing illustrates the increase in oxide content of electrodes operated for a continuous period of time at 145 amps./ft.$^2$. As is apparent, the thermally treated electrodes did not increase in oxide content, whereas the standard electrode has a substantial increase. This increase is due to the development of a corrosive oxide film which eventually penetrates boundaries between nickel particles resulting in a brittle structure and ultimate failure.

The instant electrodes are most commonly employed as oxygen or air electrodes since the corrosive influences on the oxidizing electrode of a fuel cell are more pronounced. Additionally, the electrodes can be used in both high temperature and medium temperature fuel cells employing aqueous or solid electrolytes. The electrodes can be used advantageously in any of the prior art cells, employing the commonly known fuels. The proper selection of electrolyte and fuel depends to a large extent upon those commercially available and the ultimate end use of the fuel cell. The proper selection is within the ability of one skilled in the art.

While various embodiments of the invention are set forth, the invention is not to be construed as being limited thereby. It is possible to produce still other embodiments without departing from the inventive concept herein disclosed. Such embodiments are within the ability of one skilled in the art.

What is claimed is:

1. The method of improving the fuel cell characteristics of a lithiated nickel oxide electrode comprising heat treating the electrode in an inert atmosphere at a temperature of from about 850 to 1500° F. for a period of about 15 minutes to about 2 hours.

2. The method of preparing an improved fuel cell electrode comprising the steps of forming a porous nickel structure, treating said structure in a lithium solution, sintering in an atmosphere of oxygen, and thereafter heat treating the structure in an inert atmosphere at a temperature of from about 850 to 1500° F. for a period of from about 15 minutes to about 2 hours.

References Cited by the Examiner
UNITED STATES PATENTS

| | | | |
|---|---|---|---|
| 2,708,211 | 5/1955 | Koren et al. | 136—29 |
| 2,716,670 | 8/1955 | Bacon | 136—120 |
| 2,914,596 | 11/1959 | Gorin et al. | 136—120 |
| 3,042,551 | 7/1962 | Perry | 136—86 |

JOHN H. MACK, *Primary Examiner.*

JOHN R. SPECK, *Examiner.*